United States Patent [19]

Stevenson

[11] 4,161,197
[45] Jul. 17, 1979

[54] APPARATUS FOR MEASURING AND DISPENSING CHEMICAL

[75] Inventor: James S. Stevenson, Oakland, Calif.

[73] Assignee: Terminator Products, Inc., Oakland, Calif.

[21] Appl. No.: 856,783

[22] Filed: Dec. 2, 1977

[51] Int. Cl.² .................... B65B 3/04; B65B 31/00
[52] U.S. Cl. ............................. 141/18; 137/205; 141/59; 222/442
[58] Field of Search ............... 137/205; 141/2, 5, 7, 141/18, 39–43, 59, 95; 222/442, 450

[56] References Cited

U.S. PATENT DOCUMENTS

| 3,913,606 | 10/1975 | Anderson | 137/205 |
| 3,976,087 | 8/1976 | Bolton et al. | 141/59 X |

*Primary Examiner*—Richard E. Aegerter
*Assistant Examiner*—Frederick R. Schmidt

[57] ABSTRACT

The invention relates to apparatus for measuring and dispensing chemical, for use primarily in a closed system for preparation of chemical solutions or mixtures, and involves a container having an input passageway for connection to a source of chemical, and a discharge passageway for connection to a source of reduced pressure. The discharge passageway is normally blocked against discharge by a valve, but has communication with the upper region of the container, whereby, upon reducing the pressure at the discharge passageway, the pressure in the upper region of the container will likewise be reduced and cause an inflow of chemical into the measuring container. Upon subsequently lifting of the valve, means are provided for exposing the upper region to atmosphere pressure whereby, the contents of the container may discharge.

10 Claims, 2 Drawing Figures

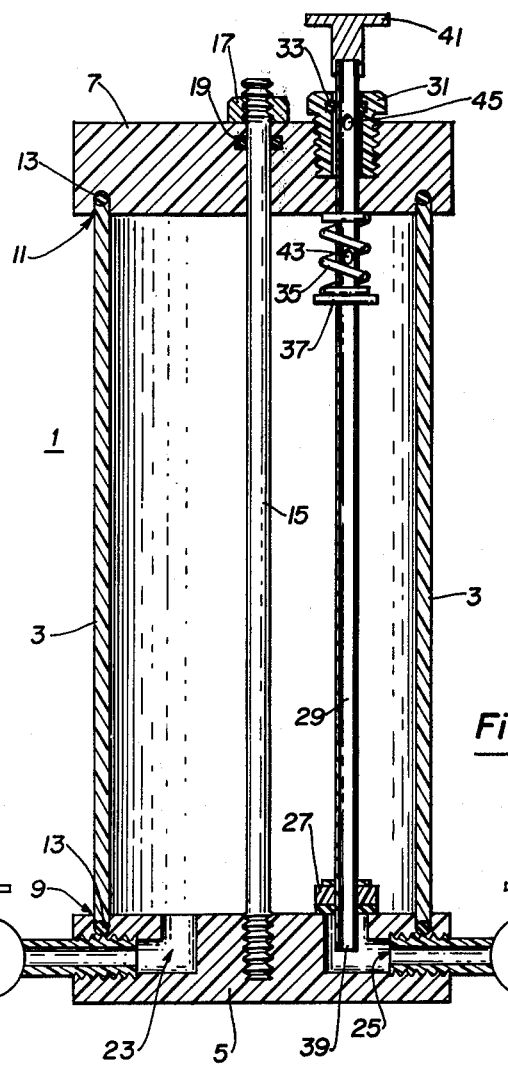
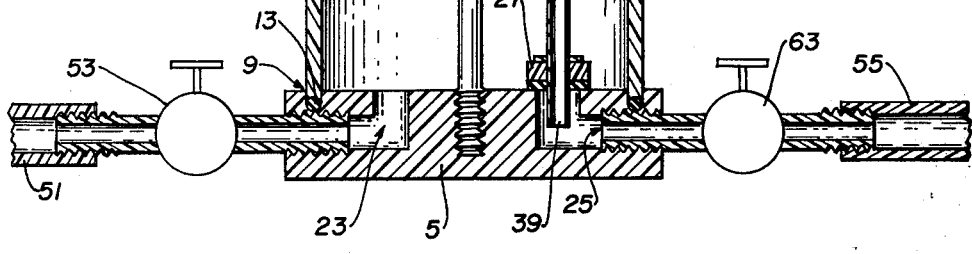
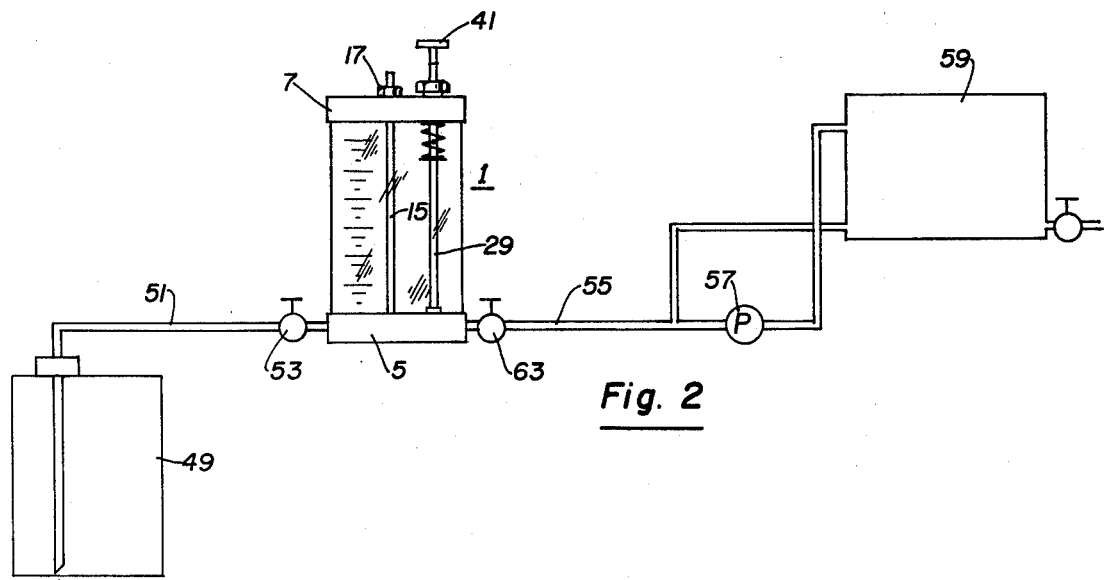
Fig. 1
Fig. 2

APPARATUS FOR MEASURING AND DISPENSING CHEMICAL

The invention relates primarily to closed systems for withdrawing a predetermined amount of chemical from a source container, to be then mixed with a base liquid in a mix tank, and more particularly, to measuring and dispensing apparatus for incorporation into such system.

A closed system is one designed for transfer of chemical from a source container to a mix tank with minimum exposure of an operator to such chemical, and thus protects the operator against contact with such chemical, which conceivably, might be quite hazardous.

Among the objects of the invention are:

(1) To provide novel and improved apparatus for use primarily in measuring and dispensing chemical in a closed system;

(2) To provide novel and improved apparatus for measuring and dispensing chemical, which is structurally simple and economical to produce.

Additional objects of the invention will be brought out in the description of a preferred embodiment of the same, taken in conjunction with the accompanying drawings wherein, FIG. 1 is a view in section through apparatus of the present invention in its preferred form;

FIG. 2 depicting schematically, a closed system in which the present invention has been incorporated to illustrate one manner of use of the present invention.

Referring to the drawings for a description of the invention in its preferred form, the same involves a container 1 comprising a cylinder 3 of glass or the like, the bottom end of which is closed by a disc 5 to provide a bottom, while the upper end is similarly closed by a disc 7 to provide a top.

The disc bottom is provided with a circular groove 9 to receive the lower end of the glass cylinder, and the top disc is similarly provided with a circular groove 11 to receive the upper end of the cylinder. An O-ring 13 in each of said grooves, functions as a seal, the effectiveness of which is intensified by a tie-rod 15 extending longitudinally of the container and threadedly secured at its lower end to the disc bottom while, at its upper end it passes through the top disc to threadedly receive a clamping nut 17. An O-ring 19 in the top disc about the tie-rod, functions to preclude flow of air out of or into the container at this point.

Intake of chemical into the container is by way of an intake passageway 23 confined to the bottom disc and extending from the cylindrical surface of the disc to the floor surface of the container, the cylindrical surface end portion of the passageway being threaded to receive a tube coupling fitting or the like.

Discharge from the container is provided for by a discharge passageway 25 similarly confined to the disc bottom, and like the intake passageway, has its cylindrical surface end portion threaded to receive a tube coupling fitting or the like. The floor surface end of the discharge passageway is spanned by a normally closed valve 27 to block discharge from the container, of any liquid content therein, while the valve is closed.

This valve is provided with a hollow stem 29 which extends upwardly through the top disc, in which it is sealed by a fitting 31 having an O-ring 33 frictionally engaging the hollow stem to seal it.

A coil spring 35 under compression between the under surface of the top disc and a pin 37 through the hollow stem, continually urges the valve 27 toward its closed position.

At its lower end, the valve stem preferably passes through the valve and terminates in an open end 39 within the discharge passageway, while at its exposed end above the top disc, the hollow stem is closed by a handle 41 fitted thereto.

At a location in the upper region of the container, the hollow valve stem is provided with a port or hole 43, while at a location higher up and just below the O-ring seal 33 in the fitting 31, the hollow stem is provided with another hole or port 45.

Upon raising of the handle 41, not only is the valve 27 raised from its closing position to expose the interior of the container to the discharge passageway, but the uppermost opening 45 in the hollow stem just below the O-ring in the fitting, will exit above the fitting and become exposed to atmosphere, which then will have access to the upper region of the container via the lower opening 43.

In putting the apparatus to use in its intended manner, the intake passageway will be flow connected to a source of chemical and the discharge passageway will be flow coupled to a source of reduced pressure or vacuum.

One such application is depicted in the closed system of FIG. 2, wherein the source of chemical will be the source container 49 in which the chemical is originally packaged and shipped, it being flow connected to the intake passageway of the present invention by a hose line 51 in which may be placed a valve 53 which may be either manually or electrically controlled.

The source of reduced pressure or vacuum to which the discharge passageway may be flow connected by a tube or hose line 55, may be the suction end of a pump 57 which may be connected in a circulating system involving a mix tank 59, whereby the pump, in circulating the base liquid of the mix tank will add the chemical dispensed from the measuring container.

By starting with a predetermined quantity of base liquid in the mix tank and adding to it, a predetermined quantity of chemical as measured in the measuring container, a desired ratio of chemical to base liquid may thus be realized, and the contents of the mix tank is then ready for spraying or for use in any other desired manner.

In operating the system thus described, the pump is started up and, with the valve 27 in its normally closed position, the reduced pressure or vacuum created by the pump will manifest itself in the measuring container via the hollow stem and the openings therein, whereupon, with the valve 53 in the line from the source container open, chemical will be withdrawn into the measuring container from the source container. When the level of chemical reaches the desired height in the measuring container, the valve 53 in the line from the source container will be shut off.

Should perchance, more chemical be drawn into the measuring container than is required to establish the desired ratio of chemical to base liquid, the set-up permits draining a portion of such chemical back into the source container until the level drops to the proper value. This can be realized by installing a valve 63 adjacent the discharge end of the discharge passageway, which can be closed to preclude discharge of chemical from the measuring container if the valve 27 is opened.

Thus by closing valve 63, opening valve 53 and then by admitting air to the measuring container through openings 45, 43 by controllable raising of the handle 41, release of chemical from the measuring container back to the source container can be realized and controlled. When the level has dropped to the desired value, valve 53 will be closed and valve 63 opened to permit pump transfer of the chemical from the measuring container to the mix tank.

With the desired quantity of chemical in the measuring container, the handle 41 is raised, whereby, not only is the valve 27 lifted from its closing position to expose the contents of the measuring container to the discharge passageway, but also at the same time, exposing the upper region of the measuring container to atmosphere pressure, thereby establishing the conditions necessary for the pump to withdraw the liquid chemical from the measuring container for transfer to the mix tank.

After the required amount of chemical has been transferred to the mix tank, the pump may be shut down, and the contents of the mix tank is ready for its intended use which, if the chemical is a pesticide or the like, the contents of the mix tank may be then employed in spraying plant growth, etc.

From the foregoing description of the invention in its preferred form, it will be apparent that the same is subject to alteration and modification without departing from the underlying principles of the invention and I, accordingly, do not desire to be limited in my protection to the specific details illustrated and described, except as may be necessitated by the appended claims.

I claim:

1. Apparatus for use in measuring and dispensing chemicals in a closed system for the preparation of a chemical mixture, comprising a measuring container, means for indicating the quantity of contents of such container, an input passageway to said container and a discharge passageway from said container, means for normally closing said discharge passageway to the discharge of contents from said container while exposing said discharge passageway to the upper region of said container, whereby development of a reduced pressure in said discharge passageway will cause a reduction of pressure in said container to enable intake of liquid via said intake passageway, and means for opening said discharge passageway from its normally closed condition while exposing said upper region to atmospheric pressure to enable withdrawal of contents from said container via said discharge passageway.

2. Apparatus in accordance with claim 1, characterized by said discharge passageway having one end at the bottom of said container and said means for normally closing said discharge passageway while exposing said discharge passageway to the upper region of said container, including a valve spanning said end of said discharge passageway and a hollow valve stem, at one end communicating through said valve to said discharge passageway, and extending to at least the upper region of said container in communication with said upper region.

3. Apparatus in accordance with claim 2, characterized by said means for opening said discharge passageway from its normally closed condition while exposing said upper region of said container to atmospheric pressure, including said valve stem extending through the upper end of said container, means for applying a lifting force to the exposed end of said stem to lift said valve from its position spanning said end of said discharge passageway, means sealing said stem where it passes through the upper end of said container, said hollow stem having an opening therein at a point just below said sealing means with said valve in its spanning position whereby, upon lifting said valve from its spanning position, said opening will appear above said sealing means for exposure to atmosphere.

4. Apparatus in accordance with claim 3, characterized by a flow line from said intake passageway for coupling to a source of chemical, a valve in said flow line, a mix tank and a pump having a discharge side connected to said mix tank, a flow line connecting said discharge passageway to the intake side of said pump, and a valve in said latter flow line at said discharge passageway.

5. Apparatus in accordance with claim 1, characterized by a flow line from said intake passageway for coupling to a source of chemical, a valve in said flow line, a mix tank and a pump having a discharge side connected to said mix tank, a flow line connecting said discharge passageway to the intake side of said pump, and a valve in said latter flow line at said discharge passageway.

6. Apparatus for use in measuring and dispensing chemicals in a closed system for the preparation of a chemical mixture, comprising a measuring container, means for indicating the quantity of contents of such container, an input passageway to said container and a discharge passageway from said container, means for normally closing said discharge passageway to the discharge of contents from said container, means for exposing the upper region of said container to a reduced pressure while said discharge passageway is closed to discharge of contents from said container, whereby development of such reduced pressure will enable intake of liquid via said intake passageway, and means for opening said discharge passageway from its normally closed condition while exposing said upper region to atmospheric pressure, to enable withdrawal of contents from said container via said discharge passageway.

7. Apparatus in accordance with claim 6, characterized by said discharge passageway having one end at the bottom of said container, said means for normally closing said discharge passageway including a valve spanning said end of said discharge passageway, and said means for exposing the upper region of said container to a source of reduced pressure including a hollow valve stem, at one end communicating through said valve to said discharge passageway, and at its other end, extending to at least the upper region of said container in communication with said upper region.

8. Apparatus for use in measuring and dispensing chemicals in a closed system for the preparation of a chemical mixture, comprising a measuring container, means for indicating the quantity of contents of such container, an input passageway to said container and a discharge passageway from said container, means for closing said discharge passageway to the discharge of contents from said container, means for exposing the upper region of said container to a source of reduced pressure to enable intake of liquid via said intake passageway while said discharge passageway is closed to discharge of contents from said container, means for opening said discharge passageway from its closed condition, and means for exposing said upper region to substantialy atmospheric pressure, to enable withdrawal of contents from said container via said open discharge passageway.

9. Apparatus in accordance with claim 8, characterized by said discharge passageway having one end at the bottom of said container, said means for closing said discharge passageway including a valve spanning said end of said discharge passageway, and said means for exposing the upper region of said container to a source of reduced pressure, including a hollow valve stem, at one end communicating through said valve to said discharge passageway, and at its other end, extending to at least the upper region of said container in communication with said upper region.

10. Apparatus in accordance with claim 9, characterized by said means for opening said discharge passageway from its closed condition including said valve stem extending through the upper end of said container, means for applying a lifting force to the exposed end of said stem to lift said valve from its positioning spanning said end of said discharge passageway, and said means for exposing said upper region to substantially atmospheric pressure including means sealing said stem where it passes through the upper end of said container, said hollow stem having an opening therein at a point just below said sealing means with said valve in its spanning position whereby, upon lifting said valve from its spanning position, said opening will appear above said sealing means for exposure to atmosphere.

* * * * *